United States Patent [19]
Zadera

[11] 4,059,513
[45] Nov. 22, 1977

[54] TREATMENT OF WATER TO REMOVE CERTAIN IONS THEREFROM

[76] Inventor: Karel V. Zadera, Sunnyhill Road, Dover, N.J. 07801

[21] Appl. No.: 770,826

[22] Filed: Feb. 22, 1977

Related U.S. Application Data

[63] Continuation-in-part of Ser. No. 601,645, Aug. 4, 1975, abandoned, which is a continuation of Ser. No. 498,318, Aug. 19, 1974, abandoned.

[51] Int. Cl.$^2$ .................... C02B 1/20; C02B 5/02; C02C 5/02; B01D 21/01
[52] U.S. Cl. .................................. 210/45; 210/53; 210/234
[58] Field of Search .................. 210/22, 234, 45, 46, 210/48, 49, 51, 52, 53, 67, 259; 162/29, 30 R, 30 K

[56] References Cited

U.S. PATENT DOCUMENTS

| | | | |
|---|---|---|---|
| 2,359,748 | 10/1944 | Clemens | 210/45 |
| 3,345,288 | 10/1967 | Sontheimer | 210/46 |
| 3,399,975 | 9/1968 | Otten | 210/46 |
| 3,419,493 | 12/1968 | Pangle | 210/45 |
| 3,446,731 | 5/1973 | Harsh | 210/53 |
| 3,627,679 | 12/1971 | Fuller | 210/45 |
| 3,736,254 | 5/1973 | Croom | 210/53 |
| 3,833,463 | 9/1974 | Croom | 210/53 |
| 3,839,199 | 10/1974 | Weiss | 210/20 |
| 4,017,391 | 4/1977 | Black | 210/45 |

Primary Examiner—Wilbur L. Bascomb, Jr.
Assistant Examiner—Ernest G. Therkorn

[57] ABSTRACT

High sulfate content water is treated in a multistage process to remove sulfate and hardness. Sulfate concentration is reduced in the first stage of the process by addition of calcium hydroxide. Calcium concentration is reduced in the second stage of the process by reaction of carbon dioxide or bicarbonate and calcium and hydroxide ions from the first stage of the process, forming insoluble calcium carbonate.

4 Claims, 3 Drawing Figures

TREATMENT OF WATER TO REMOVE CERTAIN IONS THEREFROM

CROSS-REFERENCE

This application is continuation-in-part of application Ser. No. 601,645 filed Aug. 4, 1975 which application continuation of application Ser. No. 498,318 filed Aug. 19, 1974, now both abandoned.

BACKGROUND OF THE INVENTION

1. Field of the Invention

The present invention relates to a method of treating water to remove hardness and/or sulfate concentration.

The present day commercial processes reduce hardness by ion exchange in sodium, hydrogen cycle operation and "Desal Process" or the following softening reactions forming insoluble calcium carbonate and magnesium hydroxide:

$$Ca(HCO_3)_2 + Ca(OH)_2 = 2 CaCO_3 + H_2O$$

$$CaCl_2 + Na_2CO_3 = CaCO_3 + 2 NaCl$$

$$CaSO_4 + Na_2CO_3 = CaCO_3 + Na_2SO_4$$

$$Mg(HCO_3)_2 + 2 Ca(OH)_2 = Mg(OH)_2 + CaCO_3$$

$$Mg Cl_2 + Ca(OH)_2 + Na_2CO_3 = Mg(OH)_2 + CaCO_3 + 2 NaCl$$

$$Mg SO_4 + Ca(OH)_2 + Na_2CO_3 = Mg(OH)_2 + CaCO_3 + Na_2SO_4$$

It can be seen that only hardness associated with alkalinity is being removed without substituting sodium for hardness.

Sulfate is being removed from water in present day commercial processes by ion exchange, reverse osmosis, electrodialisis or by barium sulfate precipitation:

$$CaSO_4 + BaCO_3 = BaSO_4 + CaCO_3$$

Reverse osmosis of acidic waste has been also applied, concentrating highly soluble calcium bisulfate followed by converting calcium bisulfate to less soluble calcium sulfate and consequent precipitation of calcium sulfate.

Calcium sulfate is a troublesome mineral in industrial water management as it restricts the reuse of water due to to its limited solubility, and tendency to scale or deposit within the industrial process and possibly downgrade the industrial process.

The concentration of calcium sulfate in an industrial process water is controlled by bleed-off from the system and applying softening reactions and processes described above, to facilitate further reuse of the waste stream.

The most advanced present day water management in evaporative cooling systems use sulfuric acid control scaling by calcium carbonate and softening reactions converting calcium sulfate to sodium sulfate. As there is no sulfate and sodium reduction in the reclamation, the concentration of dissolved solids increases due to evaporation to a point where the dissolved solids concentration must be controlled by bleedoff.

The amount of dissolved solids being bled from the system and particularly the amount of the sodium ion is greater than the amounts brought to the system with makeup water. This is a quite costly operation due to the costs of sodium carbonate and disposal of dissolved or soluble solids.

SUMMARY OF THE INVENTION

In accordance with the invention sulfate and other ions are precipitated in a multistage treatment of water containing high concentration of sulfate by adding calcium hydroxide. The reaction of calcium hydroxide is essentially divided into a stage employing action of the added calcium ions and a stage employing reactions of hydroxide ions. The separation of the actions of calcium and hydroxide ions into separate stages permits an effective use of calcium hydroxide, generally resulting removing more than one equivalent of dissolved minerals per equivalent of added calcium hydroxide.

Calcium hydroxide added in the first stage of the process substantially increases the concentration of calcium ion. As the stable concentration of sulfate ions in presence of calcium ion is limited by a "Solubility Quotient" ($QSP = (Ca^{+2}) \times (SO_4^{-2})$), the increase of calcium ion concentration brings the solution in an unstable region wherefrom calcium sulfate is precipitated in presence of solid calcium sulfate. The hydroxide ions not being employed in the precipitation of calcium sulfate remains in solution and is used in a separate stage of the process for removal of calcium ions, or hardness by reactions.

$$Ca(HCO_3)_2 + Ca^{+2} + 2 OH^{31} = CaCO_3 + H_2O$$

$$Mg(HCO_3)_2 + 2Ca^{+2} + 2OH^{31} = Mg(OH)_2 + 2 CaCO_3 + 2H_2O$$

The waste products of this partial demineralizing are in a form of slurry of low or insuluble salts, which facilitates easy disposal.

The process is particularly suitable for treating waters to be used in physical separation processes, where the process water solids are concentrated due to removal of pure water (evaporative cooling, distillation, reverse osmosis, electrodialisis, etc.) with makeup containing carbonate and sulfate hardness, where control of carbonate and sulfate hardness is essential for maintaining troublefree operation and efficient use of water. The application of the presented invention will reduce concentration of sulfate and sulfate hardness by treating a stream of process water by lime in the first stage and treating the raw water makeup with the effluent of the first step to reduce carbonate hardness, by reacting of bicarbonates contained in the makeup water with hydroxides from the first stage effluent to form carbonates and precipitate calcium carbonate. The amount of calcium hydroxide required for the two stage treatment is essentially equal to the amount of calcium hydroxide required for the presently practiced lime softening process to remove carbonate hardness only. It is evident that the mentioned process does not add any soluble salts to the process water or waste.

Modifications of the described application can be also used for processing of raw water with exceptionally high calcium sulfate content and high alkalinity. One stream of the raw water is being treated by high dose of calcium hydroxide to remove sulfates, the second stream is reacted by the effluent from the first stream to remove bicarbonate hardness.

Another modification is processing of acidic waste, where the acidity of the waste is associated with sulfate ions. The application of calcium hydroxide to the first stage will reduce the sulfate content within the first stage, and reduce calcium content by adding carbon dioxide or bicarbonate to the following stage to react with hydroxide ions from the previous stage forming carbonate ions and precipitating calcium carbonate.

It is important to contact the water processed in the first stage with solid calcium sulfate to achieve a rate of calcium sulfate precipitation adequate for an industrial application.

In order to avoid blinding of the contacting calcium sulfate by other precipitates as iron hydroxides, calcium sulfite etc. preliminary step of precipitation the mentioned minerals by calcium carbonate is performed where applicable.

BRIEF DESCRIPTION OF THE DRAWING

The invention will be better understood by reference to the figures of the drawings wherein like numbers denote like parts throughout and wherein.

DETAILED DESCRIPTION OF THE PREFERRED EMBODIMENT

Figure 1:
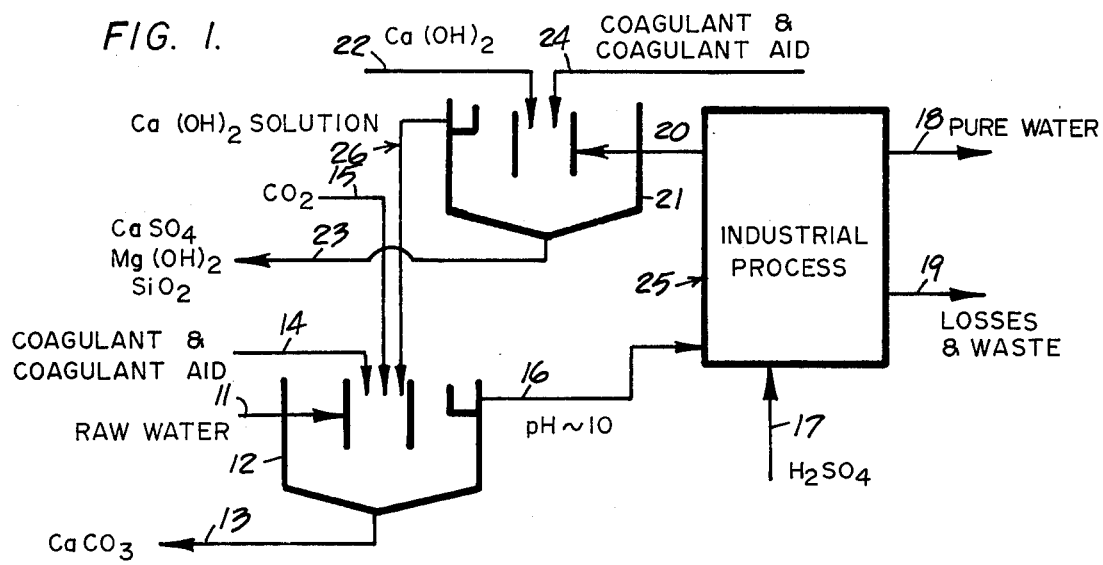
FIG. 1 is a flow diagram illustrating the use of the invention in processes where the dissolved solids present in the makeup water are concentrated by means of removing pure water in any form out of the solution.

Referring more particularly to the drawings, FIG. 1 shows a flow diagram for treating makeup and recycled water from processes where pure water is removed in an industrial process as evaporative cooling, distillation, evaporation, reverse osmosis, electrodialysis and the like.

Lime softened water from a clarifier 12 is brought through a line 16 as a makeup to an industrial process indicated by block 25. The process water is recycled in the process and dissolved solids are concentrated by extracting pure water from the system through a line 18. This concentration may be effected by evaporation, distillation, reverse osmosis, or any other of known processes for removing pure water by using conventional apparatus (not shown). For example, the process 25 may comprise a cooling tower circuit wherein at least about 80% of the water introduced via line 11 is evaporated. In order to prevent scaling by calcium carbonate, sulfuric acid is added to the process through line 17. Sulfuric acid converts carbonate ions to bicarbonates with high solubility and eventually to carbon dioxide, which is released from the process as a gas to the atmosphere.

Some of the process blowdown to control concentration of sodium and chloride is discarded as waste, however the amount of the waste is reduced due to leakage, drift and other losses. The blowdown water will have a sulfate ion concentration of at least 1500 ppm as $CaCO_3$.

Calcium hydroxide in a slurry form is added through line 22 to the reaction chamber of the clarifier 21 and mixed with the recycled water entering the chamber through line 20. The amount of calcium hydroxide added is adjusted so that the concentration of calcium ion in the returned water, i.e. the effluent from the clarifier in line 26, is higher than the concentration corresponding to the saturation of the sulfate anion to be removed and corresponds to the required degree of sulfate removal.

For example, if the returned water contains calcium sulfate only in a concentration of 1562 ppm a $CaCO_3$ at 25° C, and is required to remove sulfate ions to a concentration of 1361 ppm as $CaCO_3$, the resulting calcium concentration should be about 1983.4 ppm as $CaCO_3$, and the amount of calcium hydroxide added should correspond to approximately 622.4 ppm as $CaCO_3$.

It should be pointed out that the example above is an ideal case. In actual process water, other ions such as magnesium, bicarbonate, silicate, phosphate, fluoride, chloride, sodium and the like will be present and the amount of calcium hydroxide will be partly consumed by stoichiometric reactions typical for conventional lime softening processes. In addition, the saturation point of calcium sulfate will be influenced by the presence of ions other than of calcium and sulfate. Therefore, the amount of calcium hydroxide required for the specified sulfate reduction will be higher due to the increase in the value of the saturation quotient of calcium sulfate and by the amount of calcium hydroxide consumed in other reactions as described above. Correspondingly the concentration of hydroxide ions in the effluent from the clarifier 26 will be higher than the 622.4 ppm as $CaCO_3$, listed for the pure solution of calcium sulfate entering the reaction.

It should be pointed out that in the presence of silica, phosphate, fluoride and the like, the concentration of those anions will be depressed in a similar manner as listed for calcium sulfate as by coprecipitation, and the concentration of those anions may be maintained at the desired level in the industrial process 25 as well as the sulfate concentration. Even if the concentrations of some of those ions are very low in the raw makeup stream 11, they have heretofore proven to be troublesome in intensive re-use of the water, and often very difficult to remove, as fluoride for example. However, the present process is especially valuable in providing an improved method which also removes these ions.

The suspended salts or insoluble formed in the reaction with lime in the clarifier 21 are separated by settling. Coagulant as $Fe_2(SO_4)_3$ and coagulant aid can be added to aid agglomeration of the solid particles, enhance settling rates and thereby improve separation from the treated water. The insolubles are accumulated at the bottom of the clarifier, and periodically withdrawn through line 23. The rate of the solids withdrawal is controlled so that adequate concentration of suspended calcium sulfate is maintained in the reaction chamber to aid the reaction. The concentration of suspended solids in the slurry withdrawn from the clarifier through line 23 will depend on the equipment design and operating conditions, however, it may be further concentrated by other means of separation and the separated liquid may be returned to the clarifier 21 is required.

The effluent from the clarifier 21 is transferred through line 26 to the reaction chamber of the raw water clarifier 12. This effluent from the lime treatment in line 26 contains a substantial amount of calcium and hydroxide ions, besides neutral salts as decreased in the clarifier 21 from the industrial process water. This solution of calcium and hydroxide ions is then mixed in the reaction chamber of the raw water clarifier 12 with the raw water intake brought to the reaction chamber through line 11.

The intake water contains bicarbonate alkalinity in most natural water sources, and this bicarbonate in the raw water reacts with the calcium and hydroxide brought with the stream 26 forming carbonate and consequently insoluble calcium carbonate is released from the solution and separated by sedimentation.

The raw makeup water generally contains sulfate and the amount of sulfate is further increased by use of sulfuric acid for pH control of the process water.

It is evident from the above description that the process applied in this arrangement will produce substantial benefits when the raw water contains hardness and the amount of sodium equivalents is greater than the amount of chloride equivalents.

Carbon dioxide may be added to the reaction chamber of the clarifier 12 through the line 15 if the amount of alkalinity in the raw water is not adequate to cover the amount of calcium and hydroxide ions entering the reaction chamber of the clarifier 12 through line 26. Magnesium hydroxide and some silica may also be precipitated from the raw water as in other lime softening processes. Coagulant, and coagulant aid may also be added through line 12 to aid agglomeration and settling of solid particles. The insolubles are collected at the bottom of the clarifier and are periodically withdrawn through line 13 in a controlled manner, as to maintain adequate concentration of suspended solids in the clarifier to aid its proper operation.

The clear supernatant from the clarifier 12, is transferred through line 16 from the makeup of the industrial process 25 for recycling as described.

A typical example of the process performance for a simple saturated solution of calcium treated with various doses of calcium hydroxide in the first step, with calcium hydroxide alkalinity reduced to 50 ppm as $CaCO_3$ in the second step at 25° C is listed in the following table.

Experimental values of decrease of calcium sulfate concentration by addition of calcium hydroxide at 25° C and calculated decrease of total dissolved solids concentration from the original solution by decrease of alkalinity to 50 ppm as $CaCO_3$ by recarbonation by carbon dioxide is also shown in the table.

| $Ca(OH)_2$ Addition | Resulting $CaSO_4$ Concentration | $CaSO_4$ Reduction | Total Dissolved Solids Reduction |
|---|---|---|---|
| ppm as $CaCO_3$ | ppm as $CaCO_3$ | ppm as $CaCO_3$ | ppm as $CaCO_3$ |
| 0 | 1562. | 0 | 0 |
| 110.6 | 1491. | 71. | 21. |
| 313.9 | 1409. | 153. | 103. |
| 622.4 | 1361. | 201. | 151. |
| 1090. | 1265. | 297. | 247. |
| 1675. | 1200. | 362. | 312. |
| 2179.* | 1166.5 | 395.5 | 345.5 |

*At calcium hydroxide addition of 2179 ppm as $CaCO_3$, the solution is saturated by calcium hydroxide.

The performance of the process is not impaired by other ions present in the solution and can be as well performed at other temperatures above freezing point and below the critical temperature of the solution. The multiplicity of variables in the process and mainly equilibria in solutions of high concentrations do not permit a rigorous arbitrary performance prediction.

Compared with available or practiced processes the result of the performed process is a smaller amount of consumed chemicals, a smaller amount of waste water, no addition of soluble salts to the industrial process, and removed impurities are slurries of solid minerals. The factors all contribute to a lesser impact on the environment, when compared to the processes commercially available and/or presently in use.

A comparison of makeup lime softening and sidestream lime soda softening as practiced with the presently available technology and with the application of the described process has been predicted for a typical surface water in Example 1 below as follows:

EXAMPLE 1

A typical makeup water and the minerals added and removed in a process according to the invention are given in the table below:

| | |
|---|---|
| pH | 7.9 |
| Ca ppm as $CaCO_3$ | 120 |
| Mg ppm as $CaCO_3$ | 20 |
| Na ppm as $CaCO_3$ | 108 |
| $HCO_3$ ppm as $CaCO_3$ | 132 |
| $SO_4$ ppm as $CaCO_3$ | 155 |
| Cl ppm as $CaCO_3$ | 11 |
| $CO_2$ ppm as $CO_2$ | 3 |
| $SiO_2$ ppm as $SiO_2$ | 12 |

| | Present Most Economical Process: Lime Softening and Lime Soda Softening | Described Method |
|---|---|---|
| Concentration Factor | 50 | 103 |
| $Na_2SO_4$ ppm as $CaCO_3$ | 10 000 | 10 000 |
| $CaSO_4$ ppm as $CaCO_3$ | 1 040 | 330 |
| $SiO_2$ ppm as $SiO_2$ | 150 | 100 |
| Blowdown Gallons per 1000 Gallons of Evaporation | 20 | 10 |
| Quick Lime lbs. per 1000 Gallons of Evaporation | 1.2 | 1.2 |
| Soda Ash lbs. per 1000 Gallons of Evaporation | 0.9 | 0 |
| Solid Waste lbs. per 1000 Gallons of Evaporation | 3.5 | 4.5 |
| Dissolved Waste lbs. per 1000 Gallons of Evaporation | 0.84 | 0.083 |

It is evident from the tables above that the described process offers substantial advantages as to the quality of the process water, as well as water re-use, waste disposal and environmental impact of the industrial water use process.

Figure 2:
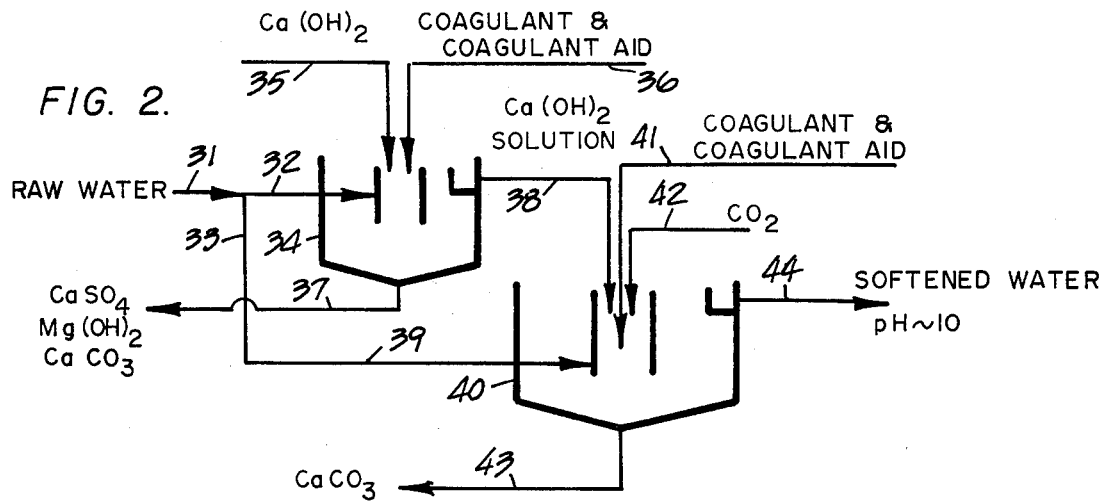
FIG. 2 is a flow diagram illustrating the use of the invention in treating water with a high concentration of sulfate ions.

FIG. 2 shows a flow diagram for the utilization of the process for treating waters with high hardness, sulfate concentration and some alkalinity in order to obtain water having a substantially lower hardness and mineral content than can be achieved by lime softening.

The raw water coming in through a line 31 is divided into two streams as in lines 32 and 33. The line 32 is brought to the reaction chamber of the clarifier 34, where calcium hydroxide is added through line 35. Magnesium sulfate is converted to calcium sulfate and insoluble magnesium hydroxide in the clarifier 34. In addition, the concentration of calcium ion is increased to a value above the concentration corresponding to the saturation by calcium sulfate, and calcium sulfate will precipitate out of the solution. The precipitation of calcium sulfate is aided by seeds of solid calcium sulfate which is maintained as a suspension of adequate concentration in the reaction chamber. Other minerals, or calcium salts with low solubility are also precipitated in this section.

Coagulant and coagulant aid is brought through the line 36 to help coagulate and settle the suspended and precipitated solids form the reaction mixture. The insolubles are concentrated at the bottom of the clarifier and are in a controlled manner drawn from the clarifier through the line 37 so as to maintain the desired retention of seeds of precipitate in the reaction chamber of the clarifier 34.

The supernatant from the clarifier 34 is transferred through the line 38 to the reaction chamber of the clarifier 40 where it is mixed with the raw water stream 39 from line 33.

The hydroxide alkalinity and corresponding excess of the calcium ion concentration from the stream of line 38 reacts with the bicarbonate alkalinity and carbon dioxide from the stream 39 forming insoluble calcium carbonate, which precipitate in the reaction chamber. Other minerals or components with low solubility also precipitate in the reaction chamber. If the alkalinity and carbon dioxide content of the raw water stream 39 is not adequate to cover the amount of hydroxide and calcium ions available from the stream 38, carbon dioxide is added through line 42 as a supplement to produce insoluble calcium carbonate.

Agglomeration and settling of the suspended insolubles is aided by addition of a coagulant and coagulant aid which is added through the line 41. These insolubles settle at the bottom of the clarifier, from which they are periodically withdrawn through a line 43 in a controlled manner in order to maintain adequate concentration of suspended solids in the reaction chamber of the clarifier 40. These suspended solids act to increase the rate of precipitation of low soluble minerals from the solution and aid in achieving the solid phase/solution equilibria.

The concentration of suspended solids in the streams 37 and 43 largely depends on the design of the equipment and operation parameters. These streams can be further concentrated by available separation methods to the desired concentration and the liquid stream from the separation returned to the corresponding clarifier.

Example 2 below is given to illustrate the operation of the embodiment of FIG. 2, which is also characterized as split stream softening:

EXAMPLE 2

The expected results which can be achieved by a conventional lime softening and the described process were made for a postulated quality of water from a deep well, and the comparison is shown in the following table showing the composition of starting materials and the additions and removals taking place in a typical process. The process is based on 1000 gallons of raw water split into two fractions of 195 gallons in line 32 and 805 gallons in line 33.

| Constituent | Well Water Quality | Conventional Softening Effluent Quality | Described First Step Effluent Quality | Process Effluent Quality |
|---|---|---|---|---|
| pH | 6.5 | 10 | 12 | 12 |
| Ca ppm as $CaCO_3$ | 1000 | 900 | 2500 | 780 |
| Mg ppm as $CaCO_3$ | 800 | 790 | 0 | 650 |
| Hardness ppm as $CaCO_3$ | 1800 | 1690 | 2500 | 1430 |
| Na ppm as $CaCO_3$ | 1000 | 1000 | 1000 | 1000 |
| $SO_4$ ppm as $CaCO_3$ | 2500 | 2500 | 1200 | 2240 |
| Cl ppm as $CaCO_3$ | 150 | 150 | 150 | 150 |
| $HCO_3$ ppm as $CaCO_3$ | 150 | 0 | 0 | 0 |
| $CO_3$ ppm as $CaCO_3$ | 0 | 20 | 0 | 20 |
| $CO_2$ ppm as $CaCO_3$ | 350 | 0 | 0 | 0 |
| OH ppm as $CaCO_3$ | 0 | 20 | 2150 | 20 |
| $SiO_2$ ppm as $SiO_2$ | 60 | 58 | 0 | 47 |

| Constituent | Conventional Softening Process | Clarifier 34 Based on ppm Water in Clarifier | Clarifier 34 and 40 Based on ppm Water in Clarifier |
|---|---|---|---|
| $Ca(OH)_2$ added ppm as $CaCO_3$ | 530 | 3450 | 670 |
| $CaCO_3$ Precipitated ppm | 630 | 650 | 630 |
| $Mg(OH)_2$ Precipitated ppm as $CaCO_3$ | 10 | 800 | 150 |
| $SiO_2$ Precipitated ppm $SiO_2$ | 2 | 60 | 13 |
| Hardness Reduction ppm as $CaCO_3$ | 110 | −810 | 370 |
| $CaSO_4$ Precipitation ppm as $CaCO_3$ | 0 | 1300 | 260 |
| Hardness Reduction per lb. of lime as $CaCO_3$ | 0.208 |  | 0.552 |

Figure 3:
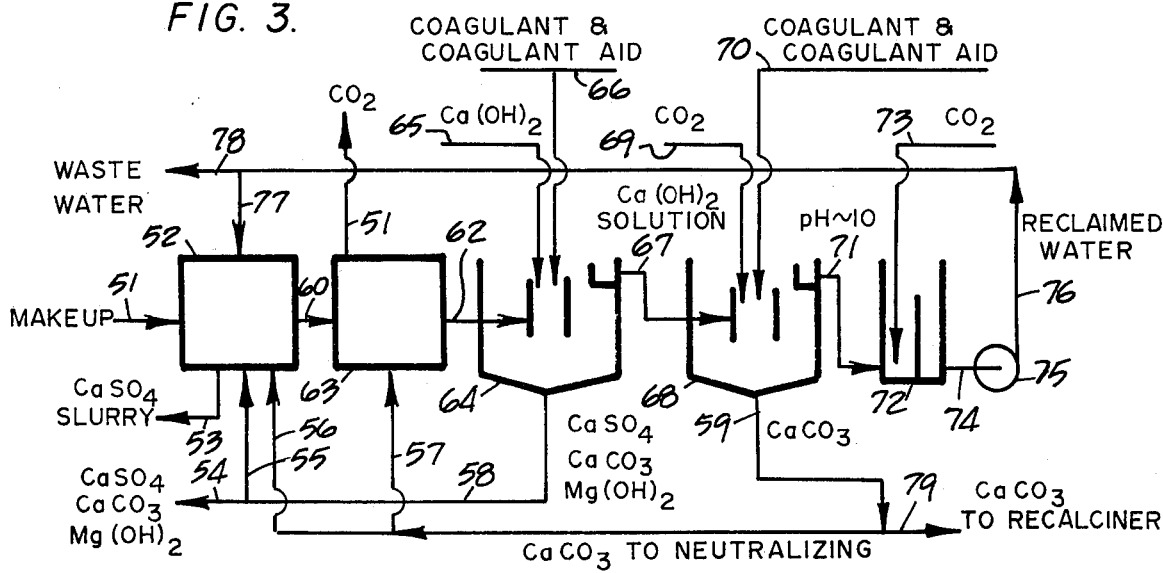
FIG. 3 is a flow diagram illustrating the use of the invention in a treatment of acid waste.

FIG. 3 illustrates the use of the invention in treating of industrial acid wastes with the emphasis on maximum re-use of water as well as maximum efficiency in the use of chemicals and production of solid, low soluble disposable wastes. The illustrated process includes most of the features which may be considered theoretically in an arbitrary industrial process with an acid waste source. However, some of the steps may be avoided if the waste chemical re-use is taken care of within the process itself.

The industrial process indicated by block 52 is supplied with makeup water through the line 51. The acid waste from the industral process is transferred through a line 60 to a neutralizing reactor 63. Slurry of waste calcium carbonate is added to the reactor through a line 57, and the acid from the waste stream is intensely mixed with the calcium carbonate in order to react, producing calcium salt and carbon dioxide. The carbon dioxide is released to the atmosphere through line 61 in the flow diagram.

The pH of the waste waster is increased according to the amount of the calcium carbonate added to the waste, and this amount is determined either by the amount available from recycling or by a requirement to precipitate ballast materials as iron hydroxides, calcium sulfite etc., to avoid blinding of the solid calcium sulfate further in the treatment process. The reaction of the acid waste with the calcium carbonate will produce a mixture of carbon dioxide, carbonic acid and carbonate dissolved in the reaction mixture, and preferably aeration or other means of efficient removal of carbon dioxide is utilized to enhance the overall efficiency in the design and the process itself. Calcium salts of the neutralized anions may precipitate during the neutralization.

The neutralized acid waste from the reactor 63 is transferred through line 62 to a reaction chamber of the clarifier 64. Calcium hydroxide is added to the reaction chamber through line 65 to produce calcium ion concentration substantially higher than that corresponding to the solubility quotient of calcium sulfate to facilitate the precipitation of calcium sulfate from the solution.

Coagulant and coagulant aid may also be added to the clarifier 64 to facilitate agglomeration of the suspended solids and their settling. The insolubles accumulate at the bottom of the clarifier and are periodically withdrawn through line 58. Substantial concentration of solid calcium sulfate is maintained in the reaction chamber in order to speed up the release of the dissolved calcium sulfate from the supersaturated solution.

The suspended solids withdrawn by the line 58 contain calcium carbonate and possibly some unreacted calcium hydroxide in addition to the calcium salts removed from the waste. The alkalinity of this waste may be beneficial to the industrial process which generated the acid waste and may be returned for the use of the process, if desired, through line 55. If there is no benefit or only marginal benefit in their use, the wastes are discharged to disposal through line 54. When the sludge from the clarifier 64 is used in process 52, the insoluble calcium salts, which remain after using the alkalinity of the sludge, are discharged to waste disposal directly from the process 52 through the line 53. The sludge from the clarifier 64 used in the process 52 may also serve as a means to maintain suspension of the insoluble calcium salts in the process 52, if required.

The supernatant from the clarifier 64 contains a high concentration calcium ions, a high concentration of hydroxide ions. The concentration of sulfate is lower than the inlet concentration. The supernatant is transferred through the line 67 to the reaction chamber of the clarifier 68. Carbon dioxide is added through the line 69 to form carbonate ions with the hydroxide ions present and subsequently react with the calcium ions, forming insoluble calcium carbonate. In this way, most of the calcium is removed from the solution. Coagulant and coagulant aid may be added through the line 70 to aid agglomeration of the solid particles and their settling to the bottom of the clarifier.

The calcium carbonate accumulated at the bottom of the clarifier is periodically withdrawn through the line 59 and transferred through the line 57 to the neutralizing reactor 63. This is an alternate use of the calcium carbonate sludge, which may be used in the industrial process 52 as described above. The calcium carbonate sludge can be also transferred through the line 79 for recalcining to calcium oxide and serve as a source of calcium hydroxide for the clarifier 64.

The supernatant from the clarifier 68 contains low concentrations of the anions brought with the acid waste and low concentrations of calcium and carbonate. The supernatant will not exhibit scaling conditions by calcium sulfate, however, it will be saturated by calcium carbonate. The supernatant is transferred through the line 71 to a recarbonator 72, where carbon dioxide is added through the line 73 to convert carbonate ions to bicarbonate ions. In this way, the remaining calcium is present as highly soluble calcium carbonate and the reclaimed water does not exhibit scaling conditions and is fairly neutral. Transfer of this water is effected through line 74, pump 75, and transfer line 76 for re-use in the industrial process 25 by entry through the line 77, or for discharge to waste through the line 78.

The process shown in FIG. 3 is particularly suitable for the use in $SO_2$ scrubbing from the flue gas where the benefits of an infinited recycling of water without scaling problems and production of low soluble calcium sulfate and calcium sulfite with be appreciated.

The novelty of the described process in the use as a part of $SO_2$ scrubbing consists of the expansion in the lime addition, where addition of lime is carried to achieve high concentration of calcium and hydroxide in order to precipitate calcium sulfate, followed by the use of carbon dioxide to precipitated calcium carbonate in the first step and then convert the calcium carbonate remaining in the solution to highly soluble calcium carbonate. Recycling of the sludge from the clarifier 64 is a novelty which increases the efficiency of the alkali used in the process, minimizes the amount of solid waste, and aids in the decrease of scaling in the process equipment. However, it cannot be used universally in all scrubbing processes.

High concentration of sodium sulfate in the reclaimed water will produce additional benefits to the process. Due to the addition of calcium hydroxide in the clarifier 64, some of the sulfate ion associated with sodium will be converted to insoluble calcium sulfate and replaced with hydroxide ions and after the recarbonation it will produce sodium carbonate and sodium bicarbonate in the reclaimed water. This way, the $SO_2$ scrubbing process using calcium base will approach efficiency and trouble free performance if sodium based scrubbing processes.

The sodium sulfate required to provide adequate concentration to produce free sodium hydroxide in the reaction with calcium hydroxide is maintained in the process water due to the concentrating of makeup water with low concentration of sodium sulfate caused by the evaporation in the scrubbing process, or using wastes from other water treatment processes containing high concentrations of sodium sulfate.

Scrubbed flue gas or $CO_2$ gas from recalcining may be used as a source of the carbon dioxide used in the clarifier 68 and recarbonator 72. The impurities contained in those sources of carbon dioxide will have only a small influence on the reclaimed water quality and will not impair its usability.

The optimum concentration of sodium sulfate in the process water is around 10,000 ppm as $CaCO_3$ where the smallest doses of calcium hydroxide will produce the required precipitation of calcium sulfate and associated conversions.

In Example 3, an application of the described process is given, in which the scrubbing technique is carried out in a way providing a scrubbing solution carrying sodium sulfate in a concentration ranging from approximately 0.1 to 1.0 mols per liter.

Effluent from the scrubber having a pH of approximately 5, and a mineral acidity of up to 500 ppm as $CaCO_3$ is brought to the reactor, where the acidity of the stream, which is attributed to $HSO_3^-$ and $HSO_4^-$ is neutralized by calcium carbonate sludge produced later in the process. Air mixing in the reactor is preferred in order to release carbon dioxide which enters the reactor with the process stream and is generated by the neutralizing reaction with calcium carbonate. Calcium sulfite and possibly some calcium sulfate will precipitate in the reactor. The reaction mixture is then brought to a clarifier, where calcium hydroxide is added in an amount producing a solution almost saturated by calcium hydroxide. The amount of calcium hydroxide added and dissolved in the treated stream may be as high as 0.09 mols per liter. Calcium sulfate will precipitate in the clarifier and will be removed by a periodic blowdown.

The supernatant from the clarifier is transferred to the second clarifier, said supernatant containing from 0.001 to 0.007 mols per liter of calcium ion. Carbon dioxide, possibly from flue gas is added to react with the hydroxide ions and form carbonate ions, which in turn will form low soluble calcium carbonate with calcium ions present. The calcium content of the processes stream will be reduced about 50% to 25% of the influent concentration due to precipitation of calcium carbonate.

It is expected that the saturation value for calcium carbonate will not be reached in the clarifier and the processes stream will have tendencies to scale by calcium carbonate. It is therefore transferred to a recarbonator where the pH of the processed stream is adjusted by carbon dioxide or flue gas to convert carbonate ions to bicarbonate ions and produce a nonscaling liquor. The processes stream with bicarbonate alkalinity corresponding to a value up to 0.09 mols per liter expressed as calcium hydroxide and a low calcium content is used as a spray for the demisters of the scrubber and for the scrubber itself. The bicarbonates react with $SO_2$ and $SO_3$ producing sodium and calcium sulfates, sulfites, bisulfites and bisulfates.

Calcium carbonate sludge from the second clarifier is transferred to the reactor for neutralizing the bisulfite alkalinity. Expected performance values are given in the following table:

| | |
|---|---|
| Demister spray requirement: | 50 l/min. sq. m. |
| Flue gas flow: | 200 cu. m./min. sq. m. |
| Scrubber effluent acidity: | 0.006 N |
| Reactor effluent acidity: | 0.001 N pH 7 |
| Effluent from the first clarifier: | Alkalinity 0.12 N Calcium 0.0005 mols/l. pH 11–12 |
| Effluent from the second clarifier: | Alkalinity 0.115 N Calcium 0.0025 mols/l. pH 10–11 |
| Effluent from recarbonator: | pH 7–9 |
| Flue gas amount: | 10 cu. m./kg. of coal |
| Total lime addition: | 0.121 N |
| Demister spray: 50 × 10/200 = | 2.5 l/kg. of coal |
| Lime addition: 0.121 × 2.5 = | 0.3025 gram equivalents per kg. of coal |

Assuming that stoichiometric amount of $SO_2$ and $SO_3$ is removed, it corresponds to 16 × 0 × 0.3025 − 4.84 g. of sulfur per kg. of coal.

If the emission reduction corresponds to more than 4.84 g. S/kg. of coal, supplementary alkali shall be added directly to the scrubber either in the form of lime, or as a lime treated stream as used for the demister sprays, according to the design of the scrubber.

Approximately 5 equivalents of sodium will be released from the scrubbing with water losses per kg. of sulfur reduction. This shall be covered by the makeup to the process in the form of sodium sulfate. Miscellaneous waste streams as cooling tower blowdown, demineralizer waste, etc. are suitable as sources of makeup water, as well as sodium.

One of the advantages of the process of this invention, resides in the fact that low cost sources for calcium hydroxide may be utilized. The use of a typical low quality lime source is illustrated by the following example.

EXAMPLE 4

Flyash from a coal fired power plant was tested to establish its usability as a source of lime for water softening. The quality of the flyash and the evaluation of the test results is as follows:

| Flyash Composition | |
|---|---|
| CaO | 21.9% |
| $SiO_2$ | 41.6% |
| $Al_2O_3$ | 22.4% |
| $Fe_2O_3$ | 5.4% |
| $P_2O_5$ | 0.4% |
| $TiO_2$ | 0.8% |
| $Na_2O$ | 0.3% |
| $K_2O$ | 0.1% |

| Flyash does (g/l) | OH Concentration (ppm as $CaCO_3$) | ppm OH Released per lg. flyash (ppm as $CaCO_3$/g) | ppm $SiO_2$ Leached per 1000 ppm OH as $CaCO_3$ Released from flyash (ppm $SiO_2$/1000 ppm OH as $CaCO_3$) |
|---|---|---|---|
| 0.1 | 20 | 200 | 18.5 |
| 0.4 | 45 | 115 | 10.3 |
| 1.0 | 100 | 100 | 6.4 |
| 2.0 | 180 | 90 | 6.2 |
| 4.0 | 310 | 78 | 4.1 |
| 6.0 | 405 | 68 | 2.45 |
| 8.0 | 515 | 64 | 2.25 |

The effluent from a conventional lime softening usually contains about 20 ppm hydroxide alkalinity. This corresponds to leaching of 18.5 ppm $SiO_2$ per 1000 ppm used hydroxide alkalinity and that can be objectionable for the effluent water quality.

By applying the two step processes described above, and adding the low quality lime source, the hydroxide concentration in the first step will be in the range of several hundred ppm up to the solubility of calcium hydroxide, and that will substantially decrease the amount of silica leached from the flyash. For example if the effluent from the first step contains 515 ppm OH, the amount of leach silica will be reduced to 2.25 ppm/1000 ppm OH. This is only about 12.5% of the amount of silica expected to be released in a conventional lime softening process where flyash is applied to react directly with the bicarbonate hardness. It is evident that there is a limitation as to the ballast material introduced to the sulfate reduction step where blinding of the solid calcium sulfate may occur.

From the foregoing description, it is seen that a novel two step softening process is provided, which alleviates the troublesome problems of sulfate ion buildup, utilizes low cost treating agents and high sulfate content makeup water, and provides waste materials similar to those abundantly present in nature.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. A two stage method of treating water to reduce concentrations of sulfate and hardness for use in a physical separation process where minerals contained in makeup water are concentrated by removing substantially pure water, producing sulfate ion concentrations in excess of 1500 ppm, consisting of the following steps:

a. Conducting a portion of said concentrated mineral rich process water to a first reaction chamber, adding calcium hydroxide to the first reaction chamber in an amount sufficient to substantially increase calcium ion concentration and to produce hydroxide ion concentration in excess of 1000 ppm as calcium carbonate and in the presence of solid calcium sulfate precipitate calcium sulfate, and removing portion of solid calcium sulfate from the first reaction chamber;

b. Transferring only the supernatant water from the first reaction chamber, to the second reaction chamber, adding raw makeup water to the second reaction chamber, the amount of raw water being several times greater than the amount of supernatant water from the first reaction chamber, together with sufficient amount of carbon dioxide or bicarbonate, to react with essentially all the hydroxide brought from the first reaction chamber forming carbonate and precipitate essentially all of the formed calcium carbonate;

c. Transferring only the supernatant water from the second reaction chamber to said physical separation process;

d. adding sufficient sulfuric acid to said physical separation process to prevent scaling therein;

e. treating said supernatant water in said physical separation process to yield substantially pure water and a makeup water containing carbonate and sulfate hardness.

2. A method of treating water as defined in claim 1, in which the carbon dioxide and bicarbonate is a natural component of the raw makeup water.

3. A method of treating water as defined in claim 1, in which carbon dioxide is added to the second reaction chamber to supplement natural carbon dioxide and bicarbonate content of the raw makeup water.

4. A method of treating water as defined in claim 1, in which the calcium hydroxide addition is effected by addition of low quality lime source, to the first reaction chamber with CaO content in excess of 20% and $SiO_2$ content in excess of 30%, and silica leaching is retarded due to the high calcium and hydroxide concentration in the first reaction chamber.

* * * * *